United States Patent Office 3,451,873
Patented June 24, 1969

3,451,873
METHOD FOR CROSSLINKING POLYPHENYLENE SULFIDE POLYMERS AND PREPARING LAMINAR STRUCTURES
Ian R. Harrison, Cleveland Heights, Ohio, and Harry A. Smith and Carl E. Handlovits, Midland, Mich., assignors to The Dow Chemical Company, Midland, Mich., a corporation of Delaware
No Drawing. Filed Feb. 1, 1967, Ser. No. 613,106
Int. Cl. C08g 43/00; C09j 3/16, 5/06
U.S. Cl. 156—325    2 Claims

ABSTRACT OF THE DISCLOSURE

The present invention concerns a novel method for crosslinking polyphenylene sulfide or sulfoxide polymers which comprises mixing the polymer and a reactive metal, both in a finely divided state, fluidizing the mixture and curing the mixture, by the application of heat. The present invention also concerns a method of laminating various materials which comprises introducing the above mixture between the laminar structures, such as ceramics and metals, heating under pressure the sandwich formed, and postcuring for from 4 to 72 hours at 300° to 400° C.

BACKGROUND OF INVENTION

Polyphenylene sulfide polymers are disclosed in Macallum U.S. Patents Nos. 2,513,188 and 2,538,941, and Smith, U.S. Patent No. 3,291,779, and copending applications Ser. No. 268,444, entitled, "Sulfoxide Resins," filed Mar. 27, 1963, now Patent No. 3,326,865; and Ser. No. 454,644, entitled, "Method for Preparing Linear Polyarylene Sulfide," filed May 10, 1965, now Patent No. 3,274,165, by R. W. Lenz, C. E. Handlovits and W. K. Carrington. These polymers can be crosslinked and made into infusible, insoluble materials of high adhesion properties and good heat stability according to copending application Ser. No. 268,471, entitled "Chemically Crosslinked Polyphenylene Sulfides," filed Mar. 27, 1963, now Patent No. 3,324,087. These crosslinked, polyphenylene sulfide and sulfoxide polymers are somewhat cumbersome to prepare by these art techniques, requiring lengthy heatings with some loss of material, and thus are of limited utility.

It is therefore an object of the present invention to provide a new and novel method for preparing the crosslinked, insoluble, infusible polymers which method provides marked advantages in shortened periods to obtain crosslinking and easier handling, thus opening up a greater field of utility.

SUMMARY OF INVENTION

In accordance with the present invention, a polyphenylene sulfide or a polyphenylene sulfoxide, in a comminuted form, is physically mixed with at least one of a similarly comminuted metal from the group silver, magnesium, copper, iron, zinc, lead, bismuth and mixtures thereof, heated to the fluid point of the resin for from 5 to 45 minutes, then heated at 300° to 400° C. for 4 hours to 72 hours to postcure the resin. By this procedure there is obtained a crosslinked resin which can be shaped when contained, that is, in a mold or between two surfaces or the like to form a more desirable resin product having improved properties over that product formed with a non-crosslinked or lesser crosslinked resin. The amount of metal employed is 5 to 100 percent by weight, based on resin. Less than 5 percent of metal results in a very lightly crosslinked resin which does not differ materially in its properties from the substantially linear polymer employed as a starting material. More than 100 percent is wasteful and offers no advantage unless the purpose is to bond the metal particles within the resinous mass. It is preferable to employ about 15 to 35 percent.

The temperature at which the initial crosslinking occurs is generally only 25° to 75° above the melting point of the polymer, that is just enough fluidity to insure fusion of the resin so that the metal is in initimate contact throughout the mixture, but not a temperature high enough to make the resin thin and runny.

After the initial period at a temperature sufficient to melt the resin, the temperature is generally reduced, although in some instance, as when the melting point of the polymer is below the postcure temperature of 300° C., the postcure temperature is higher. In any event, postcuring is carried out at between 300° and 400° C. for from 4 to 72 hours.

DESCRIPTION OF SPECIFIC EMBODIMENTS

The following examples are illustrative of the present invention but are not to be construed as limiting:

Example I

Five parts of polyphenylene sulfide, having a molecular weight of about 30,000 and a M.P. of 283–287° C., was mixed with one part of a powdered metal having a particle size of 200 mesh or less. The resulting mixture was then molded into 3″ x ¾ x 1/64″ pieces in a press at 350° C. and 110 p.s.i. for 10 minutes. After removal from the press, the samples were postcured at 350° C. in air for various lengths of time as indicated in the accompanying table. In order to measure the extent of cure, a device was constructed which could indicate at what temperature the sample, when suspended over a ½ inch hole, would fail either by breaking or by bending ¼ inch under a 15 p.s.i load (thermal flexure apparatus, TFA).

THERMAL FLEXURAL APPARATUS (TFA) RESULTS

| Metal | Postcure time | | | |
|---|---|---|---|---|
| | 0 hrs. (° C.) | 6 hrs. (° C.) | 20 hrs. (° C.) | 72 hrs. (° C.) |
| Ag | | [1] 130 | [1] 190 | [1] 350 |
| Bi | | 175 | 235 | Too weak |
| Cu | 115 | 265 | 275 | Too weak |
| Fe | 110 | 175 | 230 | Too weak |
| Pb | | 125 | 205 | 295 |
| Sn | Too weak | 170 | 175 | 200 |
| Zn | 175 | | 150 | 350 |
| None | Too weak | 120 | 170 | 225 |

[1] Temperature at which ¼ inch deflection occurs for indicated postcure time at 350° C.

Example II

Repeating the procedure in Example I, using a polymer of about 4000–5000 molecular weight and a M.P. of 260–265° C. and molding for 30 minutes at 250° C. and 100–200 p.s.i. gave the following results.

TFA RESULTS

| Metal | Postcure time | | |
|---|---|---|---|
| | 6 hrs. (° C.) | 20 hrs. (° C.) | 72 hrs. (° C.) |
| Ag | 170–230 | 250–295 | Not tested |
| Cu | 205 | 260 | Not tested |
| Pb | 160–195 | 230–255 | Not tested |
| Zn | 145–170 | 190–245 | Not tested |
| Mg | 205 | 335 | 400 |
| None | 175 | 175–230 | Not tested |

We claim:
1. A method for crosslinking and curing a resinous polyphenylene sulfide or sulfoxide polymer which comprises:
  admixing with said polymer, which has been comminuted into a finely divided state, a finely divided metal selected from the group consisting of silver, copper, iron, lead, zinc, magnesium, bismuth and mixtures thereof;

heating said mixture for from 5 to 45 minutes at a temperature at least sufficient to fluidize the resin of said mixture; and continuing heating at a temperature from about 300° to 400° C. for from 4 to 72 hours.

2. A method for laminating metals or ceramics which comprises:

admixing a comminuted dry polyphenylene sulfide polymer with a comminuted metal selected from the group consisting of silver, copper, iron, lead, zinc, magnesium, bismuth and mixtures thereof;

introducing said mixture between the surfaces to be laminated;

heating said so-prepared laminar structure to a temperature sufficient to fluidize said resin in said mixture;

maintaining said temperature for from 5 to 45 minutes; and finally, heating said laminar structure at from 300° to 400° C. for from 4 to 72 hours.

References Cited

UNITED STATES PATENTS 3,354,129  11/1967  Edmonds, et al. _____ 260—79

DONALD E. CZAJA, *Primary Examiner.*

M. I. MARQUIS, *Assistant Examiner.*

U.S. Cl. XR

260—37, 79, 79.3